United States Patent
Miura et al.

(10) Patent No.: US 8,139,468 B2
(45) Date of Patent: Mar. 20, 2012

(54) OPTICAL RECORDING MEDIUM AND RECORDING AND REPRODUCING METHOD USING THE SAME

(75) Inventors: Hiroshi Miura, Yamato (JP); Nobuaki Toyoshima, Yokohama (JP); Yoshitaka Hayashi, Yokohama (JP); Suguru Sangu, Machida (JP); Noriyuki Iwata, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 956 days.

(21) Appl. No.: 11/884,480

(22) PCT Filed: Feb. 15, 2006

(86) PCT No.: PCT/JP2006/303098
§ 371 (c)(1),
(2), (4) Date: Aug. 16, 2007

(87) PCT Pub. No.: WO2006/088218
PCT Pub. Date: Aug. 24, 2006

(65) Prior Publication Data
US 2010/0061218 A1    Mar. 11, 2010

(30) Foreign Application Priority Data

Feb. 21, 2005   (JP) ................................. 2005-044664

(51) Int. Cl.
*G11B 7/0045* (2006.01)
*G11B 5/84* (2006.01)
*G11B 7/00* (2006.01)
*G11B 7/005* (2006.01)

(52) U.S. Cl. .................. 369/275.4; 369/124.1; 369/283

(58) Field of Classification Search ................ 369/275.4, 369/124.1, 283
See application file for complete search history.

(56) References Cited

U.S. PATENT DOCUMENTS 4,847,132 A * 7/1989 Takao et al. ................ 428/64.6
5,432,774 A   7/1995 Fukumoto et al.
(Continued)

FOREIGN PATENT DOCUMENTS

CN        1239283       12/1999
(Continued)

OTHER PUBLICATIONS

Oct. 14, 2008 official action in connection with a counterpart Korean patent application.
Mar. 31, 2010 Chinese official action in connection with counterpart Chinese patent application No. 2006 8000 4824.X.
Apr. 15, 2009 European search report in connection with a counterpart European patent application No. 06 71 4238.

(Continued)

*Primary Examiner* — Will J Klimowicz
*Assistant Examiner* — Andrew Sasinowski
(74) *Attorney, Agent, or Firm* — Cooper & Dunham LLP

(57) ABSTRACT

It is an object of the present invention to provide an optical recording medium containing a laminated structure of a first deformable material layer containing a phase-change material that absorbs light at a recording wavelength to generate heat and is subject to exothermic melting and deformation and a second deformable material layer containing a material which contains a silicon oxide ($SiOx$; $0<x\leq 2$) that transmits light and is subject to thermal deformation and alteration. After information is recorded, the thickness of the first deformable material layer is changed according to the recorded information making center of the recorded marks thicker than the ends and the second deformable material layer is deformed and altered corresponding to the concave-convex-pattern formed on the first deformable material layer based on the recorded information and when the information is reproduced, the first deformable material layer is altered from solid to molten state.

10 Claims, 9 Drawing Sheets

U.S. PATENT DOCUMENTS

| | | | |
|---|---|---|---|
| 2002/0018961 A1 | 2/2002 | Abiko et al. | |
| 2003/0090991 A1 | 5/2003 | Poupinet et al. | |
| 2005/0018567 A1* | 1/2005 | Hirotsune et al. | 369/47.27 |
| 2005/0030882 A1* | 2/2005 | Kusada et al. | 369/275.4 |

FOREIGN PATENT DOCUMENTS

| | | | |
|---|---|---|---|
| EP | 0525192 A1 | | 2/1993 |
| JP | 8-306073 | | 11/1996 |
| JP | 11-115315 | | 4/1999 |
| JP | 2000-229479 | | 8/2000 |
| JP | 3361079 | | 10/2002 |
| JP | 2004220687 | * | 1/2003 |
| JP | 2003-157584 | | 5/2003 |
| JP | 2004-30864 | | 1/2004 |
| JP | 2004-86932 | | 3/2004 |
| JP | 2004-220687 | | 8/2004 |
| JP | 3602589 | | 10/2004 |

OTHER PUBLICATIONS

Kikukawa, T., et al., "Rigid bubble pit formation and huge signal enhancement in super-resolution near-field structure disk with platinum-oxide layer", *Applied Physics Letters*, vol. 81, No. 25, pp. 4697-4699, Dec. 16, 2002.

Kim, Jooho, et al., "Super-resolution by elliptical bubble formation with $PtO_X$ and AgInSbTe layers", *Applied Physics Letters*, vol. 83, No. 9, pp. 1701-1703, Sep. 1, 2003.

Kuwahara, Masashi, et al., "Thermal Origin of Readout Mechanism of Light-Scattering Super-Resolution Near-Field Structure Disk", *Japanese Journal of Applied Physics*, vol. 43, No. 1A/B, pp. L8-L10, 2004.

Yasuda, Kouichi, et al., "Premastered Optical Disk by Superresolution", *Japanese Journal of Applied Physics*, vol. 32, Part 1, No. 11B, pp. 5210-5213, Nov. 1993.

* cited by examiner

FIG. 5B

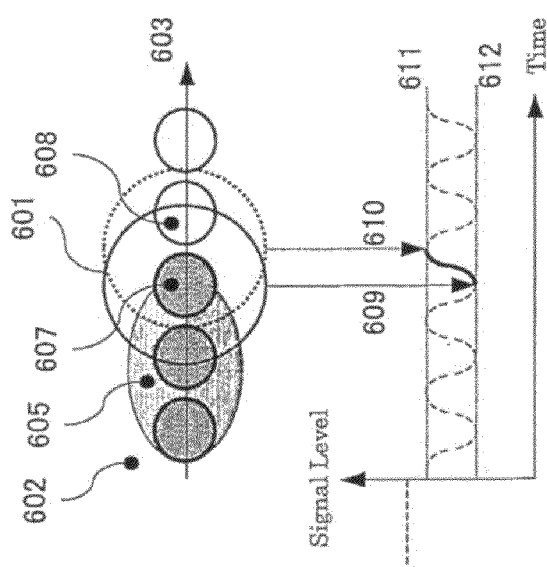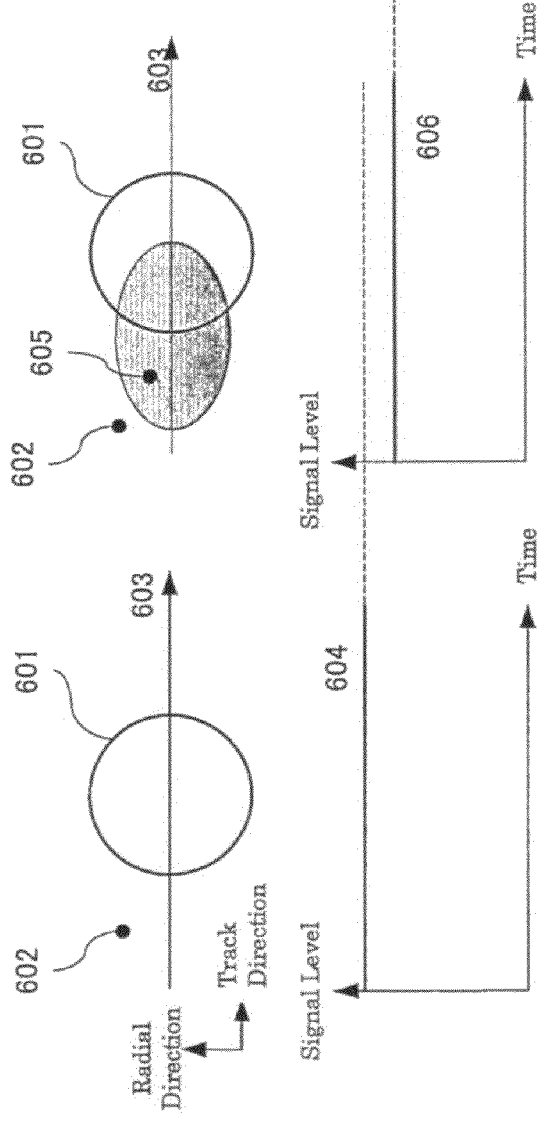

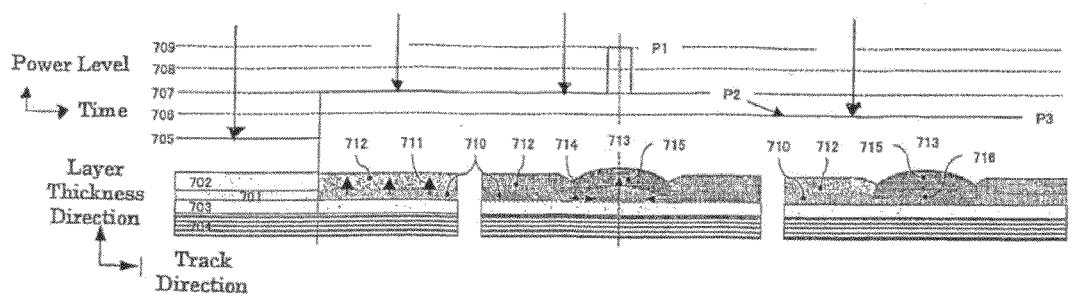
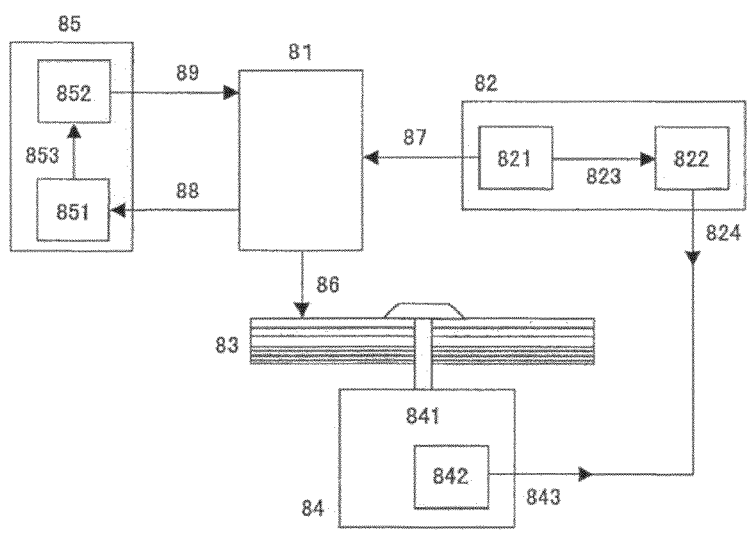
FIG. 8

| ZnS (mol%) | SiOx (mol%) | Composition Ratio ZnS/SiOx | Crystal Condition of Layer |
|---|---|---|---|
| 100 | 0 | N/A | crystal |
| 95 | 5 | 19.0 | crystal |
| 90 | 10 | 9.0 | amorphous |
| 80 | 20 | 4.0 | amorphous |
| 60 | 40 | 1.5 | amorphous |
| 30 | 70 | 0.4 | amorphous |
| 0 | 100 | N/A | amorphous |

OPTICAL RECORDING MEDIUM AND RECORDING AND REPRODUCING METHOD USING THE SAME

TECHNICAL FIELD

This disclosure relates to an optical recording medium (hereafter referred to as "optical information recording medium" or "information recording medium") for optical recording and reproducing of information and a recording and reproducing method for the optical recording medium.

BACKGROUND ART

As a technique of reproducing high density information recorded with a cycle beyond the resolution limit of the optical system in which recorded information is reproduced, super-resolution technology for optical recording media is being developed which involves a super-resolution layer on a medium in which microscopic marks or pits are reproduced. The super-resolution layer material is often a phase-change material.

For example, Patent Literature 1 discloses a method of forming a phase-change material layer on phase pits and liquefying a part of the phase-change material layer within a reproducing beam spot, thereby reproducing the phase pits corresponding to the resolution limit.

Patent Literature 2 discloses a method of providing a mask layer of Ge—Te alloy and forming in the mask layer a reproduction window having an increased optical transmittance, thereby reproducing recoded marks.

Patent Literature 3 discloses a method of providing an optical shutter layer containing three elements, Ge, Sb, and Te as main components and melting a part of the optical shutter layer within a reproducing beam spot, thereby reproducing recorded marks.

Patent Literature 4 discloses a method of providing a mask layer of Sb and irradiating the mask layer with a reproducing beam to form an optical aperture therein, thereby reproducing recorded marks.

Patent Literature 5 discloses a super-resolution reproducing method in which a mask layer is made of a dye material capable of supersaturated absorption.

As is understood from the fact that the prior art literatures refer to terms such as a mask layer, a reproduction window, an optical shutter, and an optical aperture, the conventional super-resolution reproducing method changes the optical properties of the super-resolution material in a fraction of a reproducing beam spot to reduce the effective beam diameter, thereby reproducing the microscopic marks or pits. One method of changing the optical properties of the super-resolution material in a fraction of a reproducing beam spot uses a phase-change material as the super-resolution material, in which a part of the phase-change material within a reproducing beam spot is melted.

The conventional super-resolution reproducing method is outlined hereafter with reference to FIG. 1. FIG. 1 is a cross-sectional view of an optical recording medium which contains a super-resolution material layer 101, a recording layer 102, a substrate 103, a recording mark or recording pit 104, an optical aperture 105 formed in the super-resolution material layer and a laser beam 106. Arrow 107 indicates the diameter of a beam spot and arrow 108 indicates the direction in which the laser beam is moved.

As shown in FIG. 1, in the conventional super-resolution reproducing method, an optical aperture is formed through a part of the super-resolution material within the beam spot diameter to reproduce a microscopic mark. The region within the beam spot diameter, except for the optical aperture, is shielded by the super-resolution material layer. The recording layer 102 is situated behind the super-resolution material layer 101 as seen from the light source 106. With the beam spot being blocked by the super-resolution material layer, the amount of light reaching the recording layer 102 is reduced, attenuating the intensity of the signals. When the recording mark or recording pit 104 is made smaller for higher recording densities, the optical aperture 105 accordingly must be smaller. Consequently, a fairly large part of the beam spot diameter is blocked by the super-resolution material, further attenuating the intensity of signals to the extent that the signals may not be detected.

[Patent Literature 1] Japanese Patent (JP-B) No. 3361079
[Patent Literature 2] Japanese Patent (JP-B) No. 3602589
[Patent Literature 3] Japanese Patent Application Laid-Open (JP-A) No. 08-306073
[Patent Literature 4] Japanese Patent Application Laid-Open (JP-A) No. 2000-229479
[Patent Literature 5] Japanese Patent Application Laid-Open (JP-A) No. 2003-157584.

SUMMARY

Disclosure of Invention

In an aspect of this disclosure, there is provided an optical recording medium that allows for recording and reproducing of high density information recorded with a cycle beyond the resolution limit of the optical pickup in which recorded information is reproduced without forming an optical aperture in the super-resolution material layer and a recording and reproducing method for the optical recording medium. Here, the resolution limit refers to beyond the cycle calculated by $\lambda/2$ NA in which $\lambda$ is a light wavelength and NA is the numerical aperture of an objective lens.

Additional aspects may be provided, such as, for example, the following.

The means to resolve the above problem are as follows.

<1> An optical recording medium containing a stacked structure having a first deformable material layer containing a phase-change material and is subject to exothermic melting and deformation and a second deformable material layer containing a material which contains a silicon oxide (SiOx; $0<x\leq 2$),
wherein after information is recorded, the thickness of the first deformable material layer is changed according to the recorded information making the center of the recorded marks thicker than the ends, and the second deformable material layer is deformed and altered corresponding to the concave-convex-pattern formed on the first deformable material layer based on the recorded information, and wherein the first deformable material layer is altered from solid to molten state when the information is reproduced.

<2> The optical recording medium as stated in above <1>, wherein the recording marks are deformed parts of the first and second deformable material layers.

<3> The optical recording medium as stated in above <1>, wherein the first deformable material layer contains at least antimony, Sb and Tellurium, Te and the composition ratio of Sb to Te, Sb/Te is 1.5 to 5.

<4> The optical recording medium as stated in above <1>, wherein the second deformable material layer contains at least a zinc compound and SiOx where x is 2 or less and the composition ratio of the zinc chemical compound to SiOx, zinc compound/SiOx is 1.5 to 9.

<5> The optical recording medium as stated in above <4>, wherein the zinc compound in the second deformable material layer is crystallized by laser irradiation or heat treatment.

<6> The optical recording medium as stated in above <1>, wherein the form of a recording mark is altered by laser irradiation or heating during readout.

<7> The optical recording medium as stated in above <1>, wherein the optical recording medium contains an inorganic dielectric layer disposed between a substrate and the first deformable material layer.

<8> The optical recording medium as stated in above <7>, wherein the inorganic dielectric layer contains at least ZnS and SiOx where x is 2 or less.

<9> A recording and readout method for the optical recording medium containing irradiating of laser beam with an intensity at which the second deformable material layer is deformed and altered along with a deformation of the first deformable material layer by melting during recording of information, and detecting a signal level change caused by alteration of the first deformable material layer from solid to molten state by laser beam irradiation with an intensity at which the first deformable material layer is melted during readout of recorded information, wherein the optical recording medium containing a stacked structure having a first deformable material layer containing a phase-change material that absorbs light at a recording wavelength to generate heat and is subject to exothermic melting and deformation and a second deformable material layer containing a material which contains a silicon oxide (SiOx; $0<x\leq2$) that transmits light and is subject to thermal deformation and alteration, wherein after information is recorded, the thickness of the first deformable material layer is changed according to the recorded information making the center of the recorded marks thicker than the ends, and the second deformable material layer is deformed and altered corresponding to the concave-convex-pattern formed on the first deformable material layer based on the recorded information, and wherein the first deformable material layer is altered from solid to molten state when the information is reproduced.

<10> The recording and readout method for the optical recording medium as stated in above <9>, wherein the recording marks are deformed parts of the first and second deformable material layers.

<11> The recording and readout method for the optical recording medium as stated in above <9>, wherein the light source is a semiconductor laser, the laser beam power level is modulated at least in between two levels of P1 and P2 where P1>P2 is satisfied corresponding to a recording information during recording of information, and the laser beam power level is set at level P3 where P2>P3 is satisfied during readout of recorded information.

<12> The recording and readout method for the optical recording medium as stated in above <11>, wherein the semiconductor laser has a wavelength of 390 nm to 410 nm.

BRIEF DESCRIPTION OF THE DRAWINGS

FIG. 5B is a view showing the reproduction state in the reproducing method of the present invention.

FIG. 6A is a view showing signal level changes in the reproducing method of the present invention in which an unrecorded part is reproduced with low power.

FIG. 6B is another view showing signal level changes in the reproducing method of the present invention in which an unrecorded part is reproduced with low power.

FIG. 6C is a view showing signal level changes in the reproducing method of the present invention in which an unrecorded part is reproduced with high power.

FIG. 6D is another view showing signal level changes in the reproducing method of the present invention in which an unrecorded part is reproduced with high power.

FIG. 6E is a view showing signal level changes in the reproducing method of the present invention in which a recorded part is reproduced with high power.

FIG. 6F is a view showing signal level changes in the reproducing method of the present invention in which a recorded part is reproduced with high power.

FIG. 7A is a view to explain the setting method of the laser power level in the recording and reproducing method of the present invention.

FIG. 7B is a view showing the state of the optical recording medium at the power level in FIG. 7A.

FIG. 7C is a view showing the setting method of the laser power level in the recording and reproducing method of the present invention.

FIG. 7D is a view showing the state of the optical recording medium at the power level in FIG. 7C.

FIG. 7E is a view showing the setting method of the laser power level in the recording and reproducing method of the present invention.

FIG. 7F is a view showing the state of the optical recording medium at the power level in FIG. 7E.

FIG. 7G is a view showing the setting method of the laser power level in the recording and reproducing method of the present invention.

FIG. 7H is a view showing the state of the optical recording medium at the power level in FIG. 7G.

FIG. 8 is a view showing an exemplary recording and reproducing apparatus.

BEST MODE FOR CARRYING OUT THE INVENTION

The optical recording medium of the present invention contains a laminated structure having a first deformable material layer containing a phase-change material that absorbs light at a recording wavelength to generate heat and is subject to exothermic melting and deformation, a second deformable material layer containing a material which contains a silicon oxide (SiOx; $0<x\leq2$) that transmits light and is subject to thermal deformation and alteration and other layers as necessary.

In the optical recording medium, after information is recorded, the thickness of the first deformable material layer is changed according to the recorded information making the center of the recorded marks thicker than the ends, and the second deformable material layer is deformed and altered corresponding to the concave-convex-pattern formed on the first deformable material layer based on the recorded information, and the first deformable material layer is altered from solid to molten state when the information is reproduced.

The recording marks are deformed parts of the first and second deformable material layers.

Figure 1:
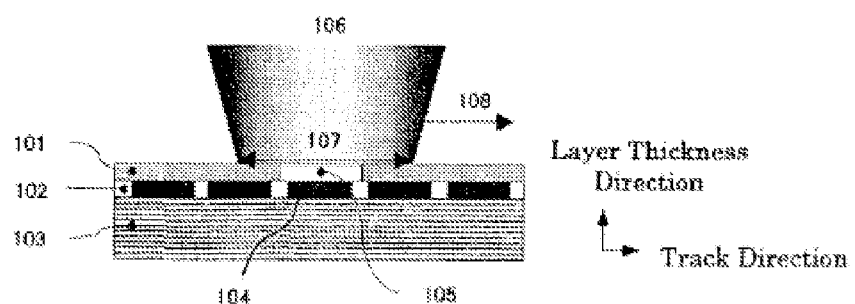
FIG. 1 is a view showing a conventional super-resolution reproducing method.
Figure 2:
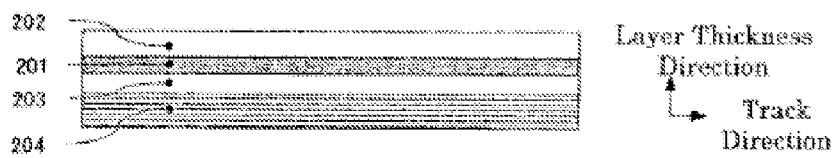
FIG. 2 is a cross-sectional view of the optical recording medium of the present invention along a recording track (unrecorded).
Figure 3:
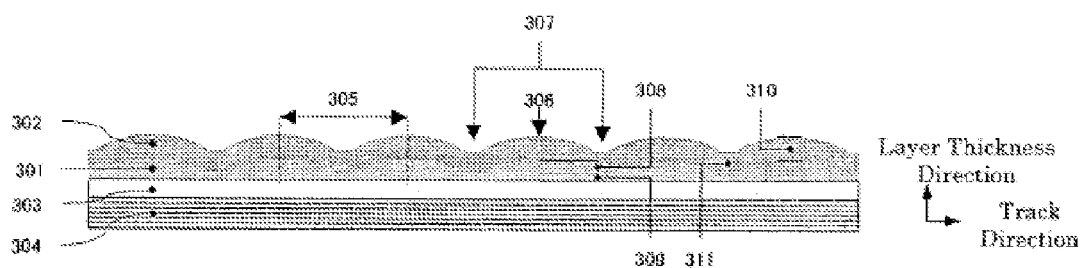
FIG. 3 is a cross-sectional view of the optical recording medium of the present invention along a recording track (recorded).

FIGS. 2 and 3 show an exemplary optical recording medium of the present invention. FIG. 2 is a cross-sectional view of the optical recording medium along a recording track in the unrecorded state. The optical recording medium contains a first deformable material layer 201, a second deformable material layer 202, an inorganic dielectric layer 203 and a substrate 204. The inorganic dielectric layer may be omitted.

The first deformable material layer 201 is made of material that absorbs light of a laser beam at a recording wavelength and is subject to exothermic melting and deformation. A phase-change material in which the phase state is transformed between solid and molten states is used. Preferably, the material has a melting point of 200° C. to 700° C. Low melting point materials such as Bi, Sn, Sb, Zn, and Te may be used. Inter-metallic compound materials such as InSb, InTe, and SbSn can also be used.

More preferably, the first deformable material layer contains at least antimony (Sb) and Tellurium (Te) and the composition ratio of Sb to Te (Sb/Te) is 1.5 to 5. Further preferably, the ratio Sb/Te is 2 to 3. The SbTe compounds falling under this range belong to the δ phase crystal system. The SbTe compounds having the δ phase composition melts without phase separation or phase transition when heated. Tellurium (Te) may be tellurium oxide (TeOx where x is 2 or less). SbTe binary system materials and materials containing elements other than Sb and Te, for example trinary system materials such as GeSbTe and quatarnary system materials such as AgInSbTe, may be used.

The optical recording medium of the present invention uses the transformation of the first deformable material layer between the solid and molten states to detect reproduction signals. Therefore, the phase separation or phase transition in the process of the transformation between the solid and molten states causes multiple signal levels, deteriorating signals in quality or making it difficult to detect the signal level. The above materials that are simply transformed between the solid and molten states are used. Transforming the first deformable material layer simply between the solid and molten states ensures high quality reproduction signals.

The second deformable material layer 202 is made of material having high optical transmittance at the recording wavelength. Having high optical transmittance, the second deformable material layer allows the underlying first deformable material layer to receive and absorb more light. Consequently, the first deformable material layer is easily deformed and the second deformable material layer reflects the deformation of the first deformable material layer. The second deformable material layer is preferably made of material that has a low density and/or is flexible when deposited and becomes consolidated and/or hardened when heated. Using the second deformable material layer made of such a material makes it possible to perform recording by deforming the second deformable material layer according to the deformation of the first deformable material layer caused by heat in association with light irradiation. Preferably, the second deformable material has a higher melting point than the first deformable material. More preferably, they have a large difference in melting point. It is desirable that the second deformable material has a melting point of 1,000° C. or higher and that the first deformable material has a melting point of approximately 200° C. to 700° C. as described above. Such a difference in the melting point inhibits mutual diffusion of the first and second deformable materials in the recording/reproduction process, preventing the deterioration of the signal quality.

The second deformable material contains a zinc compound and a silicon oxide (SiOx where x is 2 or less) and the composition ratio of zinc compound to silicon oxide (zinc compound/SiOx) is in the range of 1.5 to 9. Using such a material reduces residual stress for being thinned and a layer may be formed uniformly on a large-area substrate without having film separation. It is also possible to deposit at high speed thereby reducing the production cost.

Preferably, the second deformable material is a material containing silicon oxide (SiOx where x is 2 or less) and an additional material M. Examples of additional material M include sulfides such as ZnS, CaS, BaS, and the like, selenides such as ZnSe, BaSe, and the like, fluorine compounds such as $CaF_2$ and $BaF_2$ and oxides such as ZnO. The material containing silicon oxide (SiOx where x is 2 or less) and additional material M may be quickly deposited by sputtering. High speed depositing leads to reduced production cost of the optical recording medium.

Figures 12, 13:
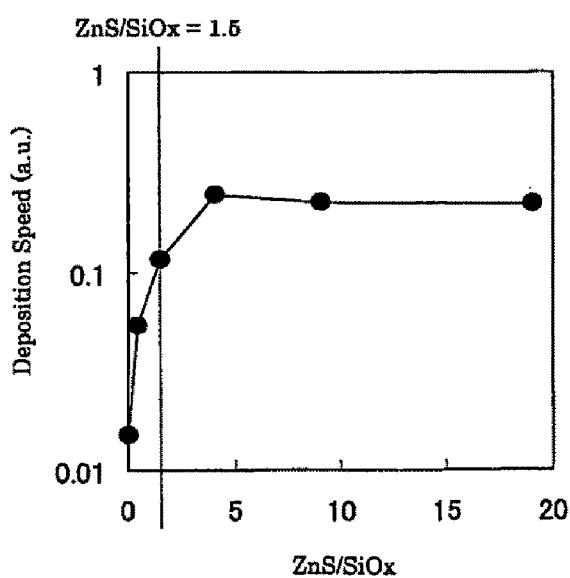
FIG. 12 is a table showing the crystal state changes by the composition ratio of ZnS—SiOx layer.
FIG. 13 is a graph showing the changes in deposition speed by the composition ratio of ZnS—SiOx layer.

More preferably, the second deformable material is a material containing at least zinc compound and silicon oxide (SiOx where x is 2 or less). Examples of zinc compounds other than zinc oxide include ZnS, ZnSe, ZnTe, and the like. Of these zinc compounds, ZnS is most preferable. The composition ratio of zinc compound to silicon oxide, zinc compound/SiOx is in the range of 1.5 to 9. If the composition ratio is expressed in mol %, it is in the range of zinc compound (60 mol %)-SiOx (40 mol %) to zinc compound (90 mol %)-SiOx (10 mol %). FIG. 12 shows the crystal state change by composition ratio. It was investigated that the deposited layer is in amorphous or crystal state. The relation between composition ratio ZnS/SiOx and crystal state was also investigated assuming the zinc compound is ZnS. The ZnS—SiOx layer was formed on a silicon substrate in a thickness of 100 nm in an argon atmosphere at a room temperature by RF sputtering.

The crystal state of the layer was investigated by X-ray diffraction. A X-ray diffraction measuring device, X'pert MRD by Philips was used utilizing Kα beam of Cu as a light source with X-ray tube voltage of 45 kV and tube current of 40 mA. A layer measurement method, low-angle-incidence asymmetric diffraction in which a beam is injected to a layer surface at a fixed angle of 0.5° using a mirror in the optical system of the light source to manipulate the angle of the detector was utilized. When diffraction angle was assumed to be 2θ in X-ray diffraction profile, it was determined to be in amorphous condition with full width at half maximum (FWHM) of all diffraction peak being 2° or more. FIG. 12 shows the relation between composition ratio ZnS/SiOx and crystal state of the ZnS—SiOx layer. The crystal state of the ZnS—SiOx layer changes by the composition ratio of ZnS/SiOx. A deposited layer with the composition ratio of 9 or less is in amorphous condition. Being in amorphous condition reduces the residual stress of the layer and forming a layer uniformly on a large-area substrate is possible. Therefore, the upper limit of the composition ratio is 9. FIG. 13 shows deposition speed of a ZnS—$SiO_2$ layer. As stated above, the ZnS—$SiO_2$ layer was deposited in an argon atmosphere at a room temperature by RF sputtering. The deposition speed changed depending on the composition ratio of ZnS/SiOx and the speed was lowered as the composition ratio became small as shown in FIG. 13. If the deposition speed is reduced too much, it is impractical because deposition time is unnecessary prolonged. Therefore, the lower limit of the composition ratio is near 1.5. Consequently, the composition ratio at which a layer is in amorphous condition at a high deposition speed to some extent is in the range of 1.5 to 9. The example was shown with ZnS as a zinc compound; however, other zinc compounds also have the same pattern. Therefore, the composition ratio of zinc compound to silicon compound, zinc compound/SiOx is set in the range of 1.5 to 9.

Figure 14:
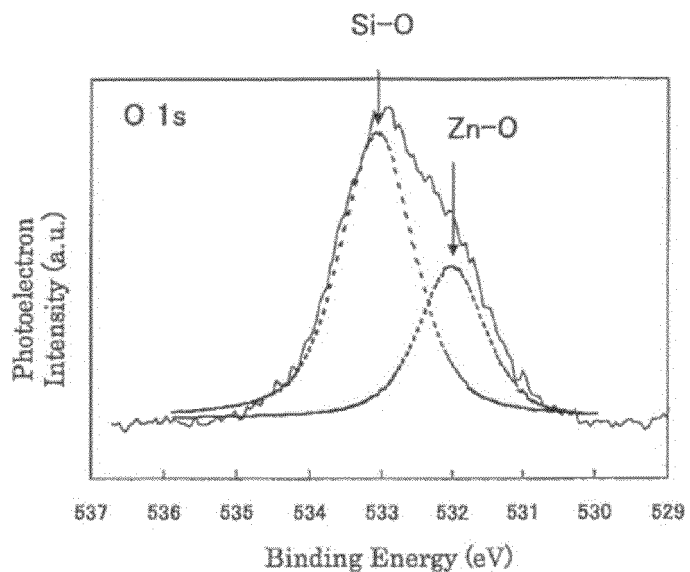
FIG. 14 is a graph showing the measurement result of the chemical bonding state of ZnS—SiOx layer.

The zinc compound may contain zinc oxide (ZnOx where x is 1 or less) with above materials. FIG. 14 is a result of investigation on chemical bonding state of the second deformable material layer. The composition of the medium is polycarbonate substrate/ZnS (80 mol %)-SiOx (20 mol %)/AgInSbTe/ZnS (80 mol %)-SiOx (20 mol %). The bonding state of oxygen element was investigated by photoemission spectroscopy (XPS) using a XPS detector by Gammadata Scienta AB on the beam line BL39XU at the radiation facility SPring-8 with a takeoff angle of 80° for photoelectron, a single-colored high-energy X-ray of 8 KeV as a light source and the field of measurement of 1,000×700 $\mu m^2$. Because high energy X-ray was used for the measurement of the sample and the high-energy photoelectron was ejected to reach the detector without being hampered by surface contamination, performing etching on the outermost surface with Ar ion was no longer necessary. The measurement was operated under the approved proposal of the leading large-scale research facility experimental program with the proposal No. 2005B0842. An application soft, "XPSPEAK Ver. 4.1" was utilized to obtain full width at half maximum (FWHM) of a peak by peak fitting. FIG. 14 shows a photoelectron spectrum of 1 S orbit of oxygen element. The photoelectron spectrum consists of two peaks. The peak of high binding energy is a photoelectron spectrum of the oxygen element having Si—O binding of SiOx. The peak of low binding energy is a photoelectron spectrum of the oxygen element having Zn—O binding of zinc oxide. Consequently, the chemical bonding state of the second deformable material layer containing zinc compound and silicon oxide (SiOx where x is 2 or less) is shown using ZnS—SiOx as an example. The zinc compound contains ZnS and a zinc oxide, ZnOx. The difference between two materials is relaxed with ZnS being contained in ZnOx, an intermediate state of SiOx in ZnS—SiOx. The residual stress of the layer is lowered by relaxing the difference between two heterogeneous materials and forming a layer uniformly on a large-area substrate is possible.

It is preferable for zinc compound in the second deformable material layer to be crystallized by laser irradiation or heat treatment. The crystallization is a condition in which diffraction or scattering peak intensity corresponding to surface separation of the crystal structure in a zinc compound is increased by laser irradiation or heating in the X-ray scattering/diffraction spectrum measurement of the second deformable material layer.

It is preferable for zinc compound in the second deformable material layer to be hardened by laser irradiation or heat treatment. The hardening is a condition in which the hardness calculated from the pushed-in depth, obtained as an indentor (Berkovich indentor) made of diamond chips, and the like is pushed in the layer surface, is increased.

The recording mark of the optical recording medium of the present invention is deformed by laser irradiation or heat treatment. The recording mark is made of deformed parts of at least a support substrate, a first deformable material layer and a second deformable material layer. The deformation is a condition in which displacement signals detected when a fixed probe on the piezoelectric elements such as tuning fork, etc. is moved near the medium surface under shear force control, is altered by laser irradiation or heating.

The inorganic dielectric layer is disposed on the interface of a first deformable material layer and a support substrate. The inorganic dielectric layer serves to reduce thermal diffusion to the substrate and prevent the substrate from being deformed during the recording of information. It also serves to reduce thermal diffusion to the substrate and lower the laser power level required for reproducing information during the information reproduction. The inorganic dielectric layer may be made of any material as long as it can reduce the conduction of heat generated in the first deformable material layer to the substrate. For example, silicon compounds such as $SiO_2$, SiON, and SiN, sulfides such as ZnS, CaS, and BaS, selenides such as ZnSe and BaSe, fluorine compounds such as $CaF_2$ and $BaF_2$, carbonates such as SiC may be used. Preferably, the inorganic dielectric layer is made of material containing silicon oxide (SiOx where x is 2 or less) and an additional material M. The additional material M may be sulfides such as ZnS, CaS, and BaS, selenides such as ZnSe and BaSe, fluorine compounds such as $CaF_2$ and $BaF_2$, and oxides such as ZnO. Materials containing silicon oxide (SiOx where x is 2 or less) and additional material M may be quickly deposited by sputtering, the high speed deposition of which leads to the reduced production costs of the optical recording medium.

More preferably, the material contains zinc compound and SiOx which have significantly low thermal conductivity after being heated and modified by irradiation light. The inorganic dielectric layer 203 using such a material efficiently, reduces heat conduction to the substrate. With the second deformable material layer 202 and inorganic dielectric layer 203 being made of the same material, the optical recording medium may be produced at reduced cost.

The substrate 204 may be a glass or quartz substrate, a Si or SOI (silicon on insulator) substrate used in semiconductors, an Al or devitrified glass substrate for HDDs (hard discs), and a resin substrate such as polycarbonate, acryl, polyolefin, epoxy, vinyl ester, and polyethylene terephthalate (PET).

FIG. 3 is a cross-sectional view of the optical recording medium along a recording track after information is recorded. The optical recording medium contains a first deformable material layer 301, a second deformable material layer 302, an inorganic dielectric layer 303 and a substrate 304. No. 305 indicates a recording mark cycle. FIG. 3 shows the recording marks of the smallest cycle repeatedly recorded. No. 306 indicates the center of a recording mark and no. 307 indicates the ends of the recording mark. Here, the recording mark refers to deformed parts of the first and second deformable material layers. The first deformable material layer 301 has a thickness 308 at the center of the recording marks and a thickness 309 at the end of the recording marks. The second deformable material layer 302 has a thickness 310 at the center of the recording marks and a thickness 311 at the end of the recording marks. Recording is done by deformation and the first deformable material layer is changed in thickness.

The first deformable material layer is thick at the recording mark center 306 and thin at the recording mark end 307. The first deformable material layer is convex at the recording mark centers and concave at the recording mark ends. The difference between the recording mark center thickness 308 and the recording mark end thickness 309 is approximately 5 nm to 50 nm. The second deformable material layer 302 is deformed according to the concave-convex pattern formed on the first deformable material layer 301. In other words, the second deformable material layer 302 serves as a shell that covers the concave-convex pattern formed on the first deformable material layer.

An embodiment of the present invention will be described hereafter with reference to FIGS. 4A to 6F.

FIG. 4 shows the recording method of the present invention. FIG. 4A shows a structure of the optical recording medium containing a first deformable material layer 401, a second deformable material layer 402, an inorganic dielectric layer 403 and a substrate 404. FIGS. 4B to 4D show the changes (chronological changes) of the medium after light irradiation.

Figure 4A:
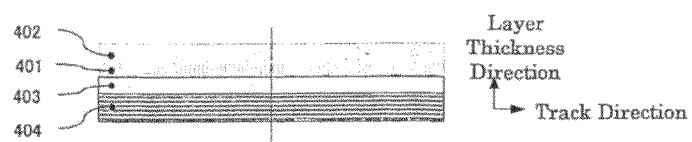
FIG. 4A is a view showing the structure of the optical recording medium used in the recording method of the present invention.
Figure 4B:
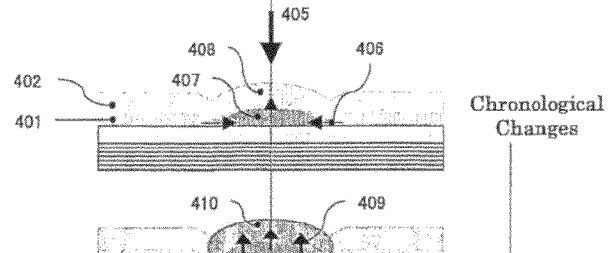
FIG. 4B is a view showing the irradiation process of the recording method of the present invention.

FIG. 4B shows the light irradiation process. No. 405 indicates light. Light is emitted on a laminated structure of the first and second deformable material layers 401 and 402 from the second deformable material layer side. The light source is a laser beam source, preferably a semiconductor laser such as GaN laser. The semiconductor laser has a wavelength of preferably 370 nm to 780 nm, more preferably 390 nm to 410 nm. Using a semiconductor laser provides inexpensive recording method and apparatus. With the laser beam power level being modulated at high speed, the semiconductor laser allows for high speed recording of high density information. A short-wavelength laser beam having a wavelength of 390 nm to 410 nm may be used to form microscopic laser spots for high density information recording.

The second deformable material layer 402 is made of a light transmissible material. The light 405 is absorbed by the first deformable material layer 401. The first deformable material layer 401 absorbs light and exothermically melts at a point irradiated with light. In FIG. 4B, arrows 406 indicate the movement and aggregation of the first deformable material. The material moves and aggregates when molten. Arrow 407 indicates a recording position in the first deformable material layer. The first deformable material layer is deformed as it aggregates. No. 408 in FIG. 4B indicates how the second deformable material layer is deformed. The second deformable material has a low density and/or is flexible. Therefore, the second deformable material layer is deformed when the first deformable material layer is deformed.

Figure 4C:
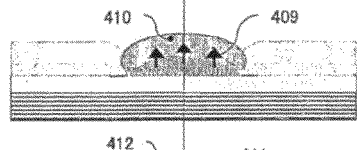
FIG. 4C is a view showing the heating process of the recording method of the present invention.

FIG. 4C shows the heating process. Arrows indicate major heat transfer within the medium immediately after light irradiation. Similar heat transfer occurs in the light irradiation process of FIG. 4B. Arrows 409 in FIG. 4C indicate heat transfer from the first deformable material layer. The first deformable material layer absorbs light and generates heat. The heat from the first deformable material layer heats the second deformable material layer. No. 410 in FIG. 4C indicates that the second deformable material layer is subject to alteration after deformation. The second deformable material is modified when heated. The deformed second deformable material is thermally modified into a consolidated and hardened state.

Figure 4D:
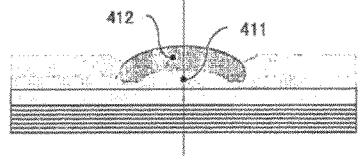
FIG. 4D is a view showing the cooling process of the recording method of the present invention.

FIG. 4D shows a cooling process. The first deformable material layer is solidified, for example crystallized, from the molten state through natural cooling. Deformed and thermally modified, the second deformable material layer becomes consolidated and/or hardened. The second deformable material layer maintains the deformed profile after cooling. No. 411 in FIG. 4D indicates the solidified first deformable material layer. No. 412 in FIG. 4D indicates the deformed and modified second deformable material layer. The second deformable material layer is deformed and modified according to the deformation of the first deformable material layer. In the present invention, light is emitted at an intensity that melts and deforms the first deformable material layer and, accordingly, deforms and modifies the second deformable material layer, creating the recorded state as shown in FIG. 3 or FIG. 4D.

FIGS. 5 and 6A to 6F show the reproducing method of the present invention. For reproducing the recorded information, light is emitted at an intensity that melts the first deformable material layer, but does not deform the second deformable material layer.

Figure 5A:
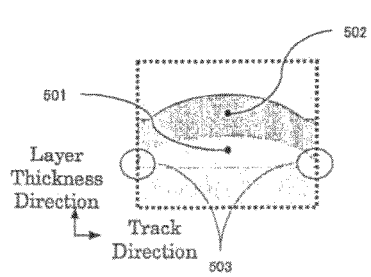
FIG. 5A is a view showing the recorded state in the reproducing method of the present invention.

FIG. 5A is an enlarged view of a recording mark in the recorded state as shown in FIG. 3 or FIG. 4D. It contains a first deformable material layer 501 and a second deformable material layer 502. The heat conduction within the layer largely depends on the thickness and the heat conductivity changes in proportion to the thickness. The first deformable material layer is reduced in thickness at the recording mark ends 503. The first deformable material absorbs light and generates heat. Because of the reduced thickness at the recording mark ends, it is difficult for the heat within the first deformable material layer to be transferred to adjacent recording marks in the recording track direction. In other words, the heat tends to be localized in each recording mark.

FIG. 5B shows the reproduction state. It has a first deformable material layer 504 in the molten state, a second deformable material layer 505, a laser beam 506 and the moving direction of the laser beam 507. Deformed according to the deformation of the first deformable material layer and modified, the second deformable material layer is in consolidated and/or hardened state. In the reproduction process, the second deformable material layer 505 maintains its profile. The second deformable material layer 505 forms a shell and the first deformable material layer 504 melts within the shell. The first deformable material layer melts and solidifies according to the shell of the second deformable material layer. Therefore, even though it melts in the reproduction process, the first deformable material layer may be repeatedly reproduced without losing its profile.

Figure 5C:
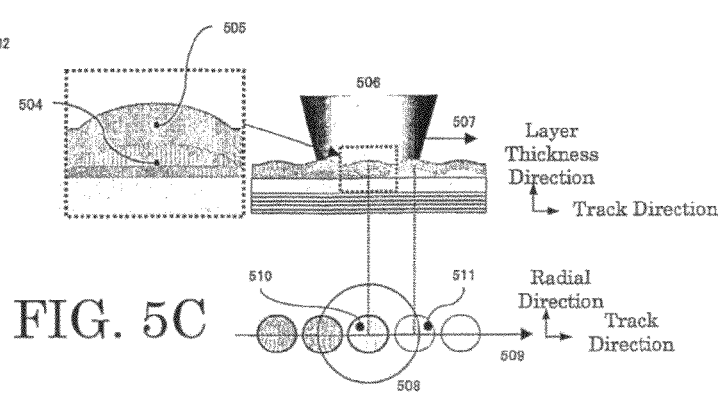
FIG. 5C is a plane view of recorded marks in the reproducing method of the present invention.

FIG. 5C is a plane view showing the state of the recording marks. No. 508 indicates a laser spot diameter. No. 509 indicates the moving direction of the laser beam. No. 510 indicates a recording mark situated at the center of a laser spot and is in the molten state. No. 511 indicates a recording mark situated ahead and in the solid state. As shown in FIG. 5A, the first deformable material layer has a reduced thickness at the recording mark ends 503; therefore, heat tends to be localized in each recording mark. Therefore, it is possible for the recording mark 511 immediately ahead of the recording mark 510 to be in the solid state even though the recording mark 510 at the laser spot center is in the molten state. Consequently, the first deformable material layer melts at each recording mark by rotation during reproduction.

FIGS. 6A to 6F show reproduction signal level changes. FIGS. 6A, 6C, and 6E are plane views of the optical recording medium showing the conditions of the first deformable material layer and the recording marks. FIGS. 6B, 6D, and 6F show reproduction signal level changes corresponding to the plane views of the optical recording medium.

FIG. 6A shows an unrecorded part reproduced using low power and FIG. 6B shows the corresponding reproduction signal level. No. 601 indicates a laser spot diameter; no. 602, a first deformable material layer; no. 603, the moving direction of the laser spot; and no. 604, chronological changes in the signal level. The signal level is constant.

FIG. 6C shows an unrecorded part reproduced with high power and FIG. 6D shows the corresponding reproduction signal level. No. 601 indicates a laser spot; no. 602, a first deformable material layer; no. 603, the moving direction the laser spot; and no. 605, a molten part of the first deformable material layer. Using an increased laser power, the first deformable material layer melts and the molten part is partially within the laser spot. No. 606 indicates chronological changes in the signal level. The signal level is constant. The signal level 606 is slightly lower than the signal level 604 during the low power reproduction because the molten part 605 of the first deformable material layer is partially within the laser spot.

FIG. 6E shows a recorded part reproduced with high power and FIG. 6F shows the corresponding reproduction signal level. No. 601 indicates a laser spot; no. 602, a first deformable material layer; no. 603, the moving direction the laser spot; no. 605, a molten part of the first deformable material layer; no. 607, a recording mark in the molten state; no. 608, a recording mark in the solid state; no. 609, a signal level when the laser spot is at the center of a recording mark; and no. 610, a signal level when the laser spot is between recording marks. As described above, the recording mark 607 at the laser spot center is in the molten state while the recording mark 608 immediately ahead is in the solid state. Heat tends to be localized in a recording mark. Therefore, the threshold value of melting temperature of the first deformable material layer 602 differs between the layer parts and the recording mark parts. The recording mark parts melt before the layer parts and the recording marks melt at the beam center. As shown by signal level 609, the signal level drops as the recording mark melts. As shown by signal level 610, when the laser spot is between the recording marks, the recording mark 608 situated ahead is in the solid state and the rate of the molten part within the laser spot is changed and the signal level is increased. The recording marks melt one by one in sequence. The rate of the molten part within the laser spot is changed according to the relative position of the laser spot to the recording mark. Consequently, cyclic signals corresponding to recording mark cycles that change between the high signal level 611 and the low signal level 612 are detected.

In the recording and reproducing method of the present invention, light is irradiated at an intensity that melts and deforms the first deformable material layer and, accordingly, deforms and modifies the second deformable material layer, thereby creating a recording mode in which heat is easily localized in each recording mark. For reproducing the recorded information, light is irradiated at an intensity that melts the first deformable material layer, but does not deform the second deformable material layer. Consequently, the signal level changes in association with the melting of the first deformable material layer in each recording mark by rotation allows for the detection of the recorded information beyond the optical resolution limit.

An embodiment of the present invention will be described hereafter with reference to FIGS. 7A to 7H.

FIGS. 7A, 7C, 7E, and 7G show laser power levels. FIGS. 7B, 7D, 7F, and 7H are cross-sectional views showing the conditions of the optical recording medium at the corresponding power levels.

FIG. 7B shows the optical recording medium at a power level 705. The optical recording medium contains a first deformable material layer 701, a second deformable material layer 702, an inorganic dielectric layer 703 and a substrate 704. The level 705 is a power level at which the optical recording medium does not change. FIG. 7D shows the optical recording medium at a power level 707. No. 710 indicates a first deformable material layer in the molten state. No. 711 indicates heat conduction from the first deformable material layer to the second deformable material layer. No. 712 indicates a second deformable material layer in a modified state. The power level 707 is a power level that raises the medium temperature above a threshold temperature at which the first deformable material layer is melted and deformed while the second deformable material layer is modified. FIG. 7F shows the optical recording medium at the power level 707 for unrecorded parts and at an increased power level 709 for a recorded part. No. 710 indicates an unrecorded part of the first deformable material layer, which is in the molten state. No. 712 indicates an unrecorded part of the second deformable material layer, which is in a modified state. No. 713 indicates a recorded part. In the recorded part, when the first deformable material melts, the material moves and aggregates. Arrows 714 in FIG. 7F indicate the movement of the material. The second deformable material layer is deformed according to the first deformable material layer and modified. No. 715 in FIG. 7F indicates the second deformable material layer deformed in a shell shape.

FIG. 7H shows the reproduction of the recording mark in FIG. 7F. The optical recording medium is at the power level 706. The first deformable material layer 710 is in the molten state. The second deformable material layer 712 is in a modified form upon the completion of recording. The reproduction power level 706 is lower than the power level 707 irradiated on unrecorded part during recording. Therefore, the unrecorded part of the second deformable material layer does not change in the reproduction process. The recorded part 713 of the second deformable material layer 715 also does not change in terms of the modified state and profile. Only the first deformable material layer 716 is melted.

For recording, the laser beam power level is modulated between two levels of P1 and P2 where P1>P2 is satisfied and the power level is raised to P1 in recording positions. Unrecorded parts are irradiated with the level P2; thereby raising the medium temperature above the threshold temperature at which the second deformable material layer is modified. For reproduction, the laser beam power level is set at level P3 where P2>P3 is satisfied. The reproduction beam power level is set lower than the power level used for irradiating the unrecorded parts during recording, thereby suppressing the alteration of the second deformable material layer during reproduction and reproduction may be repeated without having signal level fluctuation for improved repeated durability.

An embodiment of the recording and reproducing apparatus is described hereafter with reference to FIG. 8.

A recording and reproducing apparatus of FIG. 8 has a laser beam irradiation unit 81, a power level modulation unit 82, a medium rotation unit 84, and a signal detection unit 85. It also includes an optical recording medium 83 and a laser beam 86. The laser beam irradiation unit 81 consists of a laser beam source, an objective lens that focuses the laser beam, and an actuator that drives the objective lens. The laser beam source is a semiconductor laser having a wavelength of 370 nm to 780 nm. The objective lens has a numerical aperture of 0.5 to 2.0, preferably 0.8 to 0.9. Preferably, the laser beam is irradiated directly on the layer surface of the optical recording medium. In other words, the laser beam irradiation unit can irradiate a laser beam directly on the optical recording medium without involving a substrate.

The power level modulation unit 82 contains a power level modulation circuit 821 and a reference signal generation circuit 822. The power level modulation circuit 821 generates laser power level modulation signals 87. The modulation signals 87 are used to modulate the power level among at least three levels satisfying P1>P2>P3. Modulation timing signals 823 are also generated. The reference signal generation circuit 822 generates pulse reference signals 824 based on the modulation timing signals 823.

The medium rotation unit 84 contains a spin stand 841 for rotating the optical recording medium and a reference signal generation circuit 842. The reference signal generation circuit 842 generates rotation reference signals 843 based on signals from the spin stand. The pulse reference signals 824 and rotation reference signals 843 are frequency-synchronized to rotate the spin stand.

The laser beam detection unit 85 contains an optical detector 851 and a servo circuit 852. The optical detector 851 receives signals 88 from the medium and generates focus and track error signals 853. The servo circuit 852 generates laser beam irradiation unit drive signals 89 based on the error signals. An actuator is operated based on laser beam irradiation unit drive signals to reduce focus and track residual errors.

With the apparatus structure above, recording and reproducing may be performed with the laser beam power level being changed among at least three different levels satisfying P1>P2>P3 depending on recorded information.

Figure 15:
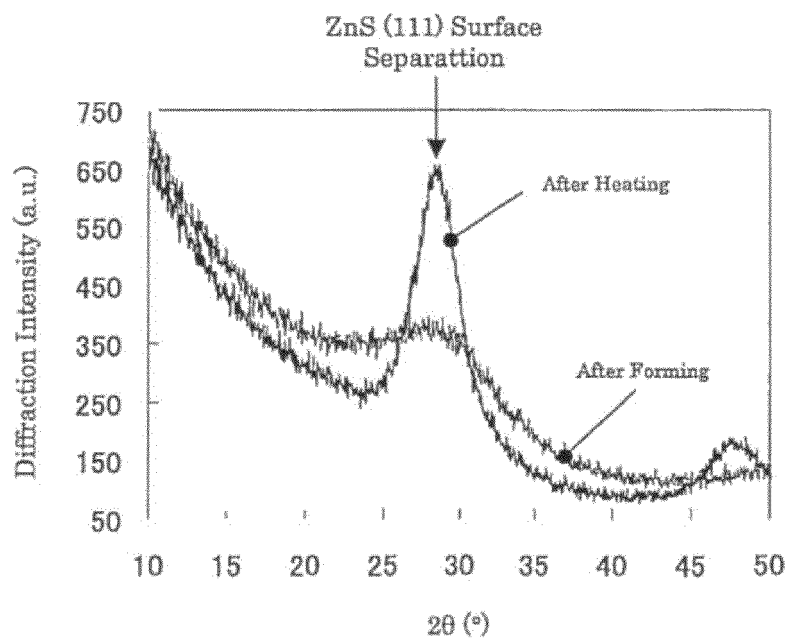
FIG. 15 is a graph showing the measurement result of X-ray diffraction of ZnS—SiOx layer.

Next, another embodiment of the present invention will be explained. In the embodiment, the second deformable material layer contains zinc compound and silicon oxide (SiOx where x is 2 or less) and the zinc compound is crystallized by laser irradiation or heat treatment. The crystallization is a condition in which diffraction or scattering peak intensity corresponding to surface separation of the crystal structure in a zinc compound is increased by laser irradiation or heating in the X-ray scattering/diffraction spectrum measurement of the second deformable material layer. The measurement result of X-ray diffraction of the second deformable material layer is shown in FIG. 15. A X-ray diffraction measuring device, X'pert MRD by Philips was used utilizing Kα beam of Cu as a light source with X-ray tube voltage of 45 kV and tube current of 40 mA. A layer measurement method, low-angle injection asymmetric diffraction method in which a beam is injected to the layer surface at a fixed angle of 0.5° using a mirror in the optical system of the light source to manipulate the angle of the detector was utilized. The second deformable material layer was formed on a silicon substrate. The material of the second deformable material layer was ZnS—SiO$_2$ and the thickness was 100 nm. The ZnS—SiO$_2$ layer was measured at the time of forming and after heat treatment. The heat treatment was performed in an electric furnace in a nitrogen atmosphere at a temperature of 600° C. for 30 minutes. The X-ray diffraction profile is shown in FIG. 15. A broad peak near 2θ=28.5 (distance d=3.13 Å) can be seen in the X-ray diffraction profile of ZnS—SiO$_2$ layer after formation. It turns out that the ZnS—SiO$_2$ layer after formation is in amorphous condition because of the broadened peak with low intensity. The peak intensity near 2θ=28.5 increases in the X-ray diffraction profile of ZnS—SiO$_2$ layer after heating. It turns out that the ZnS crystal of ZnS—SiO$_2$ layer has grown or increased by heat treatment because the position of the diffraction peak corresponds to (111) surface separation of ZnS of zinc-blende crystal structure. As stated above, the formed second deformable material layer is in amorphous condition. Being in amorphous condition reduces residual stress of the layer and forming a layer uniformly on a large-area substrate without layer separation is possible. The crystallization is performed by laser irradiation or heat treatment. If the layer is in amorphous condition, oxygen and moisture in the air is absorbed by defects such as dangling bonds, and the like which exist in the layer and the quality changes over time occurs in the second deformable material layer. By performing crystallization, defects such as dangling bonds, and the like in the composition element of the second deformable material layer can be reduced and deterioration of the second deformable material in the reproduction process is prevented leading to improved repeated durability.

Next, another embodiment of the present invention will be explained. The embodiment shows mechanical properties of the optical recording medium. The second deformable material layer contains zinc compound and silicon oxide (SiOx where x is 2 or less) and the zinc compound is hardened by laser irradiation or heat treatment. The hardening is a condition in which the hardness calculated from the pushed-in depth, obtained as an indentor (Berkovich indentor) made of diamond chips, and the like is pushed in the layer surface, is increased. It further shows the next condition in particular. Recently, the nano indentation, a method of mechanical property evaluation in nano scale is attracting attention. The nano indentation is a method in which an indentor such as diamond chips, etc. is pushed in the layer surface to obtain load-displacement curve and the hardness of the layer sample is obtained by the load-displacement curve analysis. The measurement was conducted by Tribo Scope by Ulvac-Phi Inc. The second deformable material layer was formed on a silicon substrate and heated in a nitrogen atmosphere at a temperature of 600° C. for 30 minutes using an electric furnace. The second deformable material was made of ZnS—SiO$_2$ and the thickness was 100 nm. The hardness of the ZnS—SiO$_2$ layer was measured before and after heat treatment. The hardness of the ZnS—SiO$_2$ layer before heat treatment obtained from the load-displacement curve was 6 GPa and hardness of the ZnS—SiO$_2$ layer after heat treatment was 8 GPa. As stated above, the condition of formed second deformable material layer is a flexible material and it is hardened by heat treatment. By employing such a material, deterioration of the second deformable material in the reproduction process can be prevented leading to improved repeated durability.

The recording mark of the optical recording medium of the present invention is deformed and returns to its original state by laser irradiation or heat treatment. The recording mark is made of deformed parts of at least a support substrate, a first deformable material layer and a second deformable material layer. The deformation is a condition in which displacement signals detected when a fixed probe on the piezoelectric elements such as tuning fork, etc. is moved near the medium surface under shear force control, is altered by laser irradiation or heating.

Figure 16:
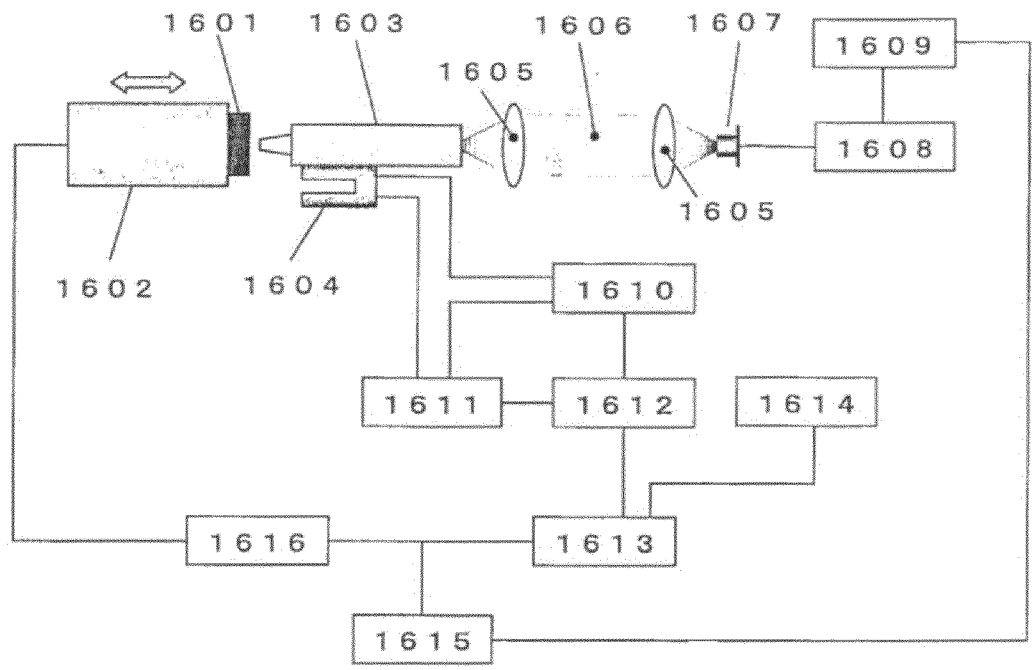
FIG. 16 is a view showing an exemplary measuring device of deformation signals caused by laser irradiation.

FIG. 16 shows a measuring device. 1601 indicates a sample, 1602 indicates a cylindrical piezo stage. 1603 indicates a fiber probe, 1604 indicates a crystal transducer which is a tuning fork. The fiber probe is fixed onto the tuning fork and vibrated. 1605 indicates lenses, 1606 indicates a laser beam and 1607 indicates a laser diode. The wavelength of the laser beam is 650 nm. 1608 indicates a laser driver which activates laser and 1609 indicates a waveform generator. 1610 indicates a waveform generator which activates tuning fork, 1611 indicates a differential amplifier and 1612 indicates a lock-in amplifier. 1613 indicates a PID control circuit, 1614 indicates a reference voltage source and 1615 indicates an oscilloscope. 1616 indicates a bipolar source for piezo activation.

Figure 11:
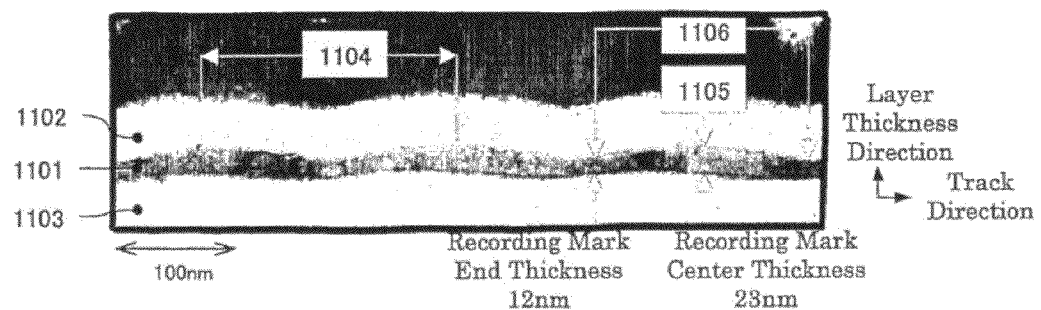
FIG. 11 is a cross-sectional image showing the optical recording medium of Examples after the smallest marks are repeatedly recorded.
Figure 17:
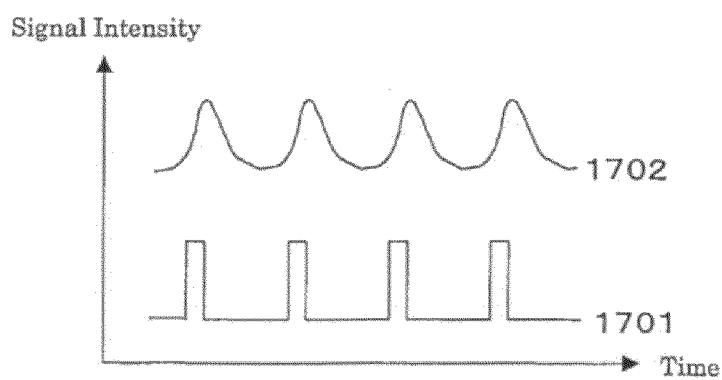
FIG. 17 is a view showing the measurement result of deformation signals caused by laser irradiation.

The composition of the sample 1601 is polycarbonate substrate/50 nm of ZnS (80 mol %)-SiOx (20 mol %)/20 nm of AgInSbTe/45 nm of ZnS (80 mol %)-SiOx (20 mol %). A recording mark was formed at a wavelength of 405 nm by a recording apparatus having optical pickup with objective lens of NA0.85 and the deformed condition of the recording mark by laser irradiation was investigated using an apparatus shown in FIG. 16. The recording mark was made of deformed AgInSbTe as a first deformable material layer and deformed $ZnS-SiO_2$ as a second deformable material layer as shown in FIG. 11. The sample in above condition was inserted in the measuring device of FIG. 16 and the displacement of the recording mark by laser irradiation was measured. The measurement result is shown in FIG. 17. 1701 indicates an output signal; a modulation signal of the laser pulse from the waveform generator and the sample was irradiated with a pulse light. 1702 indicates the change in displacement signal of cylindrical piezo stage 1602. It is the displacement signal obtained by placing the fiber probe 1603 under shear force control where separation between sample surface and the edge of the fiber probe is maintained constantly and shows that the sample surface was displaced by laser pulse irradiation. The amount of expansion and contraction of the cylindrical piezo calculated from the signal intensity was approximately 10 nm and it shows that the height of the recording mark of the sample is changed by approximately 10 nm by laser irradiation. Consequently, by having medium composition in which the recording marks are deformed by laser irradiation, the changes in optical properties and forms of the material in the reproduction process becomes the signal source. Because two different changes are included in the signals, it is possible to increase reproduction signal intensity.

The present invention provides an optical recording medium that allows for recording and reproducing of high density information recorded with a cycle beyond the resolution limit of the optical pickup without forming an optical aperture in the super-resolution material layer and a recording and reproducing method thereof.

EXAMPLE

The present invention is further described hereafter, with reference to Example. However, the present invention is not restricted to the Example.

Figure 9:
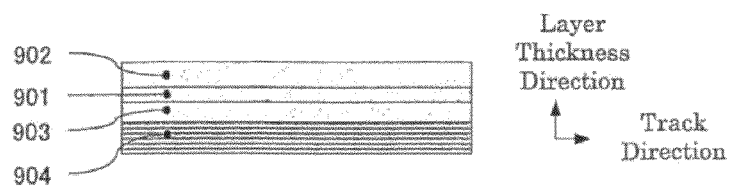
FIG. 9 is a view showing the structure of the optical recording medium of Examples.

An information recording medium having the structure shown in FIG. 9 (a cross-sectional view in the unrecorded state) was produced by depositing, on a polycarbonate substrate 904, an inorganic dielectric layer 903 of ZnS—SiOx to a thickness of 50 nm, a first deformable material layer 901 of AgInSbTe to a thickness of 20 nm, and a second deformable material layer 902 of ZnS—SiOx to a thickness of 45 nm by sputtering in this order.

The sputtering target of the first deformable material layer had a Sb/Te ratio of 2.2. The sputtering target of the second deformable material layer and inorganic dielectric layer was a mixture of ZnS and $SiO_2$ having a $ZnS/SiO_2$ ratio of 4.

Figure 10:
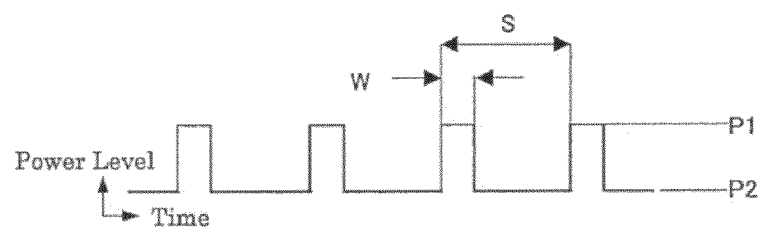
FIG. 10 is a view showing the setting method of the recording pulse in Examples.

Recording was performed on the information recording medium using a GaN semiconductor laser having a laser wavelength of 405 nm. The objective lens had a numerical aperture NA of 0.85 and the linear recording velocity was 4.5 m/sec. FIG. 10 shows the setting method of recording pulses when the smallest marks are repeatedly recorded. The laser power was modulated between two levels, P1=5 mW and P2=1.8 mW, satisfying P1>P2. The power level was measured at the medium surface. The pulse width W=12 nsec, pulse cycle S=44 nsec, and pulse duty W/S=27%.

FIG. 11 is a cross-sectional image showing the smallest marks repeatedly recorded. A recording track was processed by a focused ion beam (FIB) device on and around the center thereof and the cross-section was observed under transmission type electronic microscope (TEM).

No. 1101 indicates the first deformable material layer of AgInSbTe having a composition of Ag (4 atomic %), In (7 atomic %), Sb (61 atomic %), and Te (28 atomic %) and a Sb/Te ratio of 2.2. No. 1102 indicates the second deformable material layer of ZnS—SiOx. No. 1103 indicates the inorganic dielectric layer of ZnS—SiOx. No. 1104 indicates a smallest mark recording cycle of 200 nm. No. 1105 indicates the center of a recording mark and no. 1106 indicates the ends of the recording mark.

The first deformable material layer 1101 is larger in thickness at the recording mark centers and smaller at the recording mark ends. It has a thickness of 23 nm at the recording mark centers and a thickness of 12 nm at the recording mark ends. The second deformable material layer of ZnS—SiOx has an almost uniform thickness and is deformed according to the concave-convex pattern of the first deformable material layer of AgInSbTE.

As is apparent from this cross-sectional image, the second deformable material layer ZnS—SiOx created a record in the form of a shell that covers the concave-convex pattern of the first deformable material layer.

Using the same device as in recording, the repeatedly recorded smallest marks were reproduced. The reproduction power level was 0.2 mW and conventional reproduction conditions were applied. The signals were at a constant level and no periodic signals were observed. When the reproduction power P3=1.3 mW satisfying P2>P3 was set, periodic signals corresponding to the recorded mark cycle of 200 nm were detected. The reproduction signals had signal amplitude of 60 mW.

Figure 18:
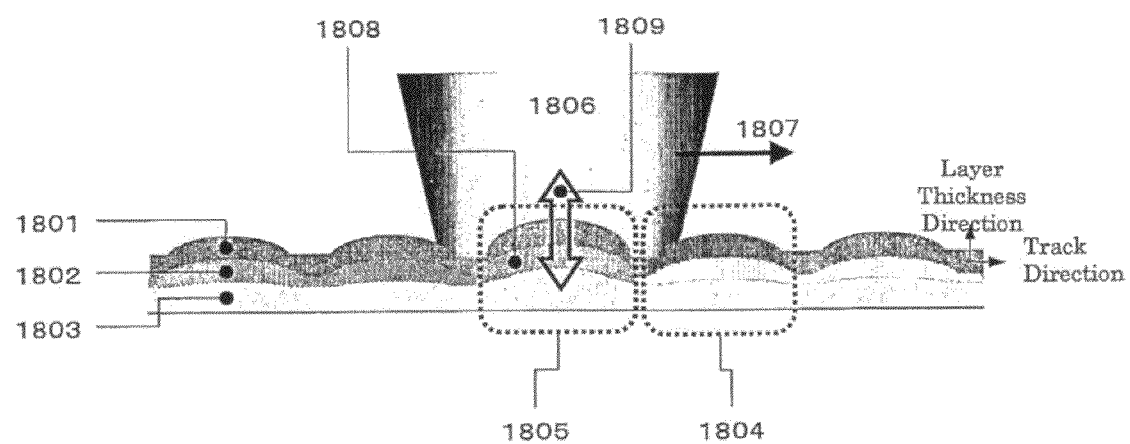
FIG. 18 is a view showing the state of the optical recording medium in the reproduction process.

FIG. 18 is a cross-sectional view showing a condition of the medium in the reproduction process. 1801 indicates a first deformable material layer of AgInSbTe, 1802 indicates of the second deformable material layer of ZnS—SiOx and 1803 indicates an inorganic dielectric layer of ZnS—SiOx. 1804 and 1805 indicates recording marks. The first deformable material layer 1801 and the second deformable material layer 1802 are in deformed condition. 1806 indicates a laser beam, 1807 indicates a traveling direction of the laser beam. The recording mark 1805 is positioned at the center of the laser beam. 1808 indicates that the material of the first deformable material layer, AgInSbTe is in a molten condition. 1809 indicates the condition in which recording mark 1805 positioned at the center of the laser beam is deformed and returns to original condition. The recording mark 1805 positioned at the center of the laser beam is heated and the change in optical constant occurs with the first deformable material layer, AgInSbTe being in a molten state and momentary deformation 1809 of the recording mark 1805 occurs by melting of the AgInSbTe. Because two different changes of optical constant and mechanical deformation becomes the source of reproduction signal, it is possible to increase signal intensity and to reproduce high density information beyond the resolution limit of the optical pickup.

INDUSTRIAL APPLICABILITY

The optical recording medium of the present invention contains at least a laminated structure of a first deformable material layer containing a phase-change material that absorbs light at a recording wavelength to generate heat and is subject to exothermic melting and deformation and a second deformable material layer containing a material which contains a silicon oxide ($SiOx$; $0<x\leq2$) that transmits light and is subject to thermal deformation and alteration. It is preferably used as an optical recording medium that allows for recording and reproducing of high density information beyond the optical resolution limit without forming an optical aperture in the super-resolution material layer.

The invention claimed is:

1. An optical recording medium comprising:
   a stacked structure which comprises a first deformable material layer comprising a phase-change material and a second deformable material layer comprising a material which contains a silicon oxide ($SiOx$; $0<x\leq2$),
   wherein after information is recorded, the thickness of the first deformable material layer is changed according to the recorded information making the center of the recorded marks thicker than the ends, and the second deformable material layer is deformed and altered corresponding to the concave-convex-pattern formed on the first deformable material layer based on the recorded information,
   wherein the second deformable material layer comprises at least a zinc chemical compound and $SiOx$ where x is 2 or less and the composition ratio of the zinc chemical compound to $SiOx$ (zinc chemical compound/$SiOx$) is 1.5 to 9, and
   wherein the second deformable material layer has a hardness of at least 8 GPa.

2. The optical recording medium according to claim 1, wherein the recording marks are deformed parts of the first and second deformable material layers.

3. The optical recording medium according to claim 1, wherein the first deformable material layer comprises at least antimony, Sb and Tellurium, Te and the composition ratio of Sb to Te, Sb/Te is 1.5 to 5.

4. The optical recording medium according to claim 1, wherein the form of a recording mark is altered by laser irradiation or heating during readout.

5. The optical recording medium according to claim 1, wherein
   the optical recording medium comprises an inorganic dielectric layer disposed between a substrate and the first deformable material layer.

6. The optical recording medium according to claim 5, wherein the inorganic dielectric layer comprises at least ZnS and $SiOx$ where x is 2 or less.

7. A recording and readout method for an optical recording medium, said method comprising:
   irradiating of laser beam with an intensity at which the second deformable material layer is deformed and altered along with a deformation of the first deformable material layer by melting during recording of information, and
   detecting a signal level change caused by alteration of the first deformable material layer from solid to molten state by laser beam irradiation with an intensity at which the first deformable material layer is melted during readout of recorded information,
   wherein the optical recording medium comprising:
   a stacked structure which comprises a first deformable material layer comprising a phase-change material that absorbs light at a recording wavelength to generate heat and is subject to exothermic melting and deformation and a second deformable material layer comprising a material which contains a silicon oxide ($SiOx$; $0<x\leq2$) that transmits light and is subject to thermal deformation and alteration,
   wherein after information is recorded, the thickness of the first deformable material layer is changed according to the recorded information making the center of the recorded marks thicker than the ends, and the second deformable material layer is deformed and altered corresponding to the concave-convex-pattern formed on the first deformable material layer based on the recorded information, and
   wherein the first deformable material layer is altered from solid to molten state when the information is readout,
   wherein the second deformable material layer comprises at least a zinc chemical compound and $SiOx$ where x is 2 or less and the composition ratio of the zinc chemical compound to $SiOx$ (zinc chemical compound/$SiOx$) is 1.5 to 9,
   wherein the second deformable material layer has a hardness of at least 8 GPa, and
   wherein the zinc chemical compound in the second deformable material layer is crystallized where the second deformable material layer is deformed and altered corresponding to the concave-convex-pattern formed on the first deformable material layer.

8. The recording and readout method for the optical recording medium according to claim 7, wherein the recording marks are deformed parts of the first and second deformable material layers.

9. The recording and readout method for the optical recording medium according to claim 7, wherein the laser beam power level is modulated at least in between two levels of P1 and P2 where P1>P2 is satisfied corresponding to a recording information during recording of information, and the laser beam power level is set at level P3 where P2>P3 is satisfied during readout of recorded information.

10. The recording and readout method for the optical recording medium according to claim 9, wherein the laser has a wavelength of 390 nm to 410 nm.

* * * * *